United States Patent
Ljung (10) Patent No.: US 10,728,929 B2
(45) Date of Patent: Jul. 28, 2020

(54) LISTEN BEFORE TALK (LBT) CONFIGURATION FOR WIRELESS COMMUNICATION IN UNLICENSED FREQUENCY BANDS

(71) Applicant: Sony Mobile Communications Inc., Tokyo (JP)

(72) Inventor: Rickard Ljung, Helsingborg (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/095,350

(22) PCT Filed: May 12, 2016

(86) PCT No.: PCT/US2016/032026
§ 371 (c)(1),
(2) Date: Oct. 20, 2018

(87) PCT Pub. No.: WO2017/196329
PCT Pub. Date: Nov. 16, 2017

(65) Prior Publication Data
US 2019/0132875 A1    May 2, 2019

(51) Int. Cl.
*H04L 12/28* (2006.01)
*H04W 74/08* (2009.01)
(Continued)

(52) U.S. Cl.
CPC ....... *H04W 74/0816* (2013.01); *H04L 5/0048* (2013.01); *H04W 72/1215* (2013.01); *H04W 74/004* (2013.01); *H04W 74/0808* (2013.01)

(58) Field of Classification Search
CPC .............................. H04W 16/14; H04W 76/27
(Continued)

(56) References Cited

U.S. PATENT DOCUMENTS

2017/0086225 A1\* 3/2017 Ljung ................... H04W 16/14
2017/0118771 A1\* 4/2017 Kazmi .............. H04W 74/0808
(Continued)

FOREIGN PATENT DOCUMENTS

CN   201510622363   \*   9/2015 ............ H04W 76/25
WO   2016/028400 A1      2/2016

OTHER PUBLICATIONS

International Search Report and Written Opinion from corresponding International Application No. PCT/US2016/032026, dated Jan. 26, 2017; 15 pages.
(Continued)

*Primary Examiner* — John Pezzlo
(74) *Attorney, Agent, or Firm* — Tucker Ellis LLP (57) ABSTRACT

Apparatus, systems, and methods provide for transmitting a Sounding Reference Signal (SRS) or other reference signal over a cellular network operating on an unlicensed radio band. Specifically, an apparatus, such as a User Equipment (UE) or Base Station (eNB), determines one or more channel sensing metrics for a radio channel. Based on the channel sensing metrics, the apparatus then determines a Listen Before Talk (LBT) mode and/or a LBT sensing time. The UE then performs a LBT process using the LBT mode and the LBT sensing time. If the UE determines that the radio channel is not occupied, the UE transmits a signal, such as a control signal (e.g., a Sounding Reference Signal (SRS)), over the radio channel.

18 Claims, 3 Drawing Sheets

(51) Int. Cl.
*H04W 72/12* (2009.01)
*H04W 74/00* (2009.01)
*H04L 5/00* (2006.01)
*H04J 1/16* (2006.01)

(58) Field of Classification Search
USPC .............................. 370/252, 329, 278, 386
See application file for complete search history.

(56) References Cited

U.S. PATENT DOCUMENTS

2017/0230944 A1* 8/2017 Babaei ................ H04W 74/006
2018/0332478 A1* 11/2018 Noh ........................ H04L 27/26
2018/0352573 A1* 12/2018 Yang ..................... H04W 16/14

OTHER PUBLICATIONS

Nokia, et al. "Channel Access for LAA UL", 3GPP TSG RAN WG1 meeting #84bis, Busan, South Korea, Apr. 11-15, 2016 (R1-162920); 9 pages.

LG Electronics, "LBT schemes in LAA UL", 3GPP TSG RAN WG1 meeting #84, St. Julian's, Malta, Feb. 15-19, 2016 (R1-160630); 10 pages.

"3rd Generation Partnership Project", Technical Specification Group Radio Access Network; 3GPP TR 36.889 V13.0.0 (Jun. 2015); 87 pages.

ZTE Microelectronics Technology et al. "Discussion on the UL LBT for LAA", 3GPP TSG RAN WG1 Meeting #84bis, Busan, Korea, Apr. 11-15, 2016 (R1-162328); 7 pages.

Sony, "eLAA Measurements and Carrier Selection Procedure", 3GPP TSG RAN WG1 meeting #84bis, Busan, Korea, Apr. 11-15, 2016 (R1-162554); 3 pages.

* cited by examiner

LISTEN BEFORE TALK (LBT) CONFIGURATION FOR WIRELESS COMMUNICATION IN UNLICENSED FREQUENCY BANDS

FIELD OF THE INVENTION

In general, embodiments of the invention relate to cellular network and, more particularly, to transmitting a Sounding Reference Signal (SRS) or other signals over a cellular network operating on an unlicensed radio band by determining one or more channel sensing metrics for a radio channel; based on the one or more channel sensing metrics, determining (i) a Listen Before Talk (LBT) mode or (ii) a sensing time; and performing a LBT process using (i) the LBT mode and (ii) the LBT sensing time.

BACKGROUND

Traditionally, cellular radio network systems were designed to run over frequencies licensed to specific mobile operators. This has been the case both 3G systems such as WCDMA, and indeed also for LTE.

Preparation is ongoing within 3GPP to start sending LTE signals over unlicensed frequencies. In the 5 GHz band, in which Wireless LAN already may operate, there is more than 400 MHz of unlicensed spectrum available in most countries, and while no one will be able to use all 400 MHz at one time, an average subscriber within range of an unlicensed LTE cell might get twice as much spectrum as in the licensed spectrum, according to certain estimates. The use of LTE on unlicensed bands has generally been considered for public places where there is coverage from licensed band LTE operation but where additional capacity would be beneficial, such as indoor cells or outdoor hot spots. The proposed solutions are designed to co-exist with a licensed LTE connection. Unlicensed LTE is therefore named LAA (Licensed Assisted Access), an extra spectrum resource, especially on, for example, the 5 GHz frequency band, which can complement licensed bands. In 3GPP this work has been divided into a first phase/version where LAA supports downlink only operation, and a second phase/version denoted eLAA (Enhanced Licensed Assisted Access) which also allows for uplink operation. Further phases/versions of LAA concepts could add additional functionality in the future. The technology and specifications developed will be a step towards mobile terminals using any kind of spectrum that is available, which is expected to continue in next-generation 5G networks.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In uplink (UL) operation, a User Equipment (UE) is typically expected to transmit both data signals and control signals. One specific type of control signal a UE is typically expected to transmit is a reference signal (e.g., a pilot signal), such as a Sounding Reference Signal (SRS). In legacy LTE operating on a licensed band, a channel is always available, and so signals, such as reference signals, can be transmitted according to a predefined (e.g., static or semi-static) transmission pattern. However, on unlicensed bands, Listen Before Talk (LBT) operation may be required before transmissions, and a transmission is typically only conducted on a channel if the channel is not busy.

One possible solution to transmitting small signals (e.g., reference signals) on unlicensed bands is to concatenate an uplink reference signal transmission with a Base Station (eNB) downlink transmission. In practice, the eNB senses that a channel is unoccupied with a LBT operation. Typically, there is a defined Maximum Channel Occupancy Time (MCOT) for the downlink transmission, and so, immediately or very close in time following the downlink transmission, the UE can transmit a reference signal without performing a separate LBT operation, provided that the MCOT has not expired. However, in many situations there may not be a downlink transmission to concatenate an uplink signal transmission.

Embodiments of the present invention address the above needs and/or achieve other advantages by providing apparatus, systems, computer program products, methods or the like for transmitting a Sounding Reference Signal (SRS) or other signals over a cellular network operating on an unlicensed radio band by determining characteristics for LBT operation. In particular, one or more channel sensing metrics (e.g., channel occupancy metric(s) and/or link quality metric(s)) are typically determined. The channel sensing metrics are then typically used to determine a LBT mode (e.g., a LBT requiring a Contention Window (CW) or a fixed sensing time) for the LBT operation and/or a LBT sensing time (e.g., an initial Contention Window Size (CWS) or a fixed sensing time) for the LBT operation. The one or more channel sensing metrics, the LBT mode, and the LBT sensing time may be determined by a User Equipment (UE) and/or by a Base Station (eNB). Thereafter, the UE typically performs the LBT operation using the LBT mode and LBT sensing time. If, as a result of the LBT operation, the UE determines that a channel is unoccupied, the UE typically then transmits a signal (e.g., a reference signal) over the channel. By using channel sensing metrics to determine characteristics for LBT operation, embodiments of the present invention provide a LBT scheme for signal transmission that is not overly complex, reduces the likelihood of interference, and allows for fair coexistence with other systems operating on unlicensed bands.

In a first embodiment, the present invention embraces a method for determining Listen Before Talk (LBT) characteristics for operating on an unlicensed radio band of a cellular network. The method includes determining one or more channel sensing metrics for a radio channel; and, based on the one or more channel sensing metrics, determining (i) a LBT mode or (ii) a LBT sensing time.

In an aspect of the first embodiment, determining the one or more channel sensing metrics includes determining a channel occupancy metric.

In another aspect of the first embodiment, either alone or in combination with any of the above aspects of the first embodiment, determining the one or more channel sensing metrics includes determining a link quality metric.

In another aspect of the first embodiment, either alone or in combination with any of the above aspects of the first embodiment, the LBT sensing time includes an initial Contention Window Size (CWS) or a fixed sensing time period.

In another aspect of the first embodiment, either alone or in combination with any of the above aspects of the first embodiment, determining (i) the LBT mode or (ii) the LBT sensing time includes: comparing a first channel sensing metric of the one or more channel sensing metrics to a threshold value; and, based on comparing the first channel sensing metric to the threshold value, determining the LBT mode.

In another aspect of the first embodiment, either alone or in combination with any of the above aspects of the first embodiment, the LBT mode requires a Contention Window (CW).

In another aspect of the first embodiment, either alone or in combination with any of the above aspects of the first embodiment, the LBT mode requires a fixed sensing time period.

In another aspect of the first embodiment, either alone or in combination with any of the above aspects of the first embodiment, determining (i) the LBT mode or (ii) the LBT sensing time includes: comparing a first channel sensing metric of the one or more channel sensing metrics to a threshold value; and, based on comparing the first channel sensing metric to the threshold value, determining the LBT sensing time.

In another aspect of the first embodiment, either alone or in combination with any of the above aspects of the first embodiment, determining the one or more channel sensing metrics includes determining, by a Base Station (eNB), the one or more channel sensing metrics; determining (i) the LBT mode or (ii) the LBT sensing time includes determining, by the eNB, (i) the LBT mode or (ii) the LBT sensing time based on the one or more channel sensing metrics; and the method includes transmitting, by the eNB, (i) the LBT mode or (ii) the LBT sensing time to a User Equipment (UE).

In another aspect of the first embodiment, either alone or in combination with any of the above aspects of the first embodiment, determining (i) the LBT mode or (ii) the LBT sensing time includes determining, by the eNB, (i) the LBT mode and (ii) the LBT sensing time based on the one or more channel sensing metrics; and transmitting (i) the LBT mode or (ii) the LBT sensing time includes transmitting, by the eNB, (i) the LBT mode and (ii) the LBT sensing time to a User Equipment (UE).

In another aspect of the first embodiment, either alone or in combination with any of the above aspects of the first embodiment, the method includes performing, by a User Equipment (UE), a LBT process using (i) the LBT mode and (ii) the LBT sensing time; wherein determining the one or more channel sensing metrics includes determining, by the UE, the one or more channel sensing metrics; and wherein determining (i) the LBT mode or (ii) the LBT sensing time includes determining, by the UE, (i) the LBT mode or (ii) the LBT sensing time based on the one or more channel sensing metrics.

In another aspect of the first embodiment, either alone or in combination with any of the above aspects of the first embodiment, determining (i) the LBT mode or (ii) the LBT sensing time includes determining, by the UE, (i) the LBT mode and (ii) the LBT sensing time based on the one or more channel sensing metrics.

In another aspect of the first embodiment, either alone or in combination with any of the above aspects of the first embodiment, the method includes receiving, by the UE, the LBT mode from a Base Station (eNB); wherein determining (i) the LBT mode or (ii) the LBT sensing time includes determining, by the UE, the LBT sensing time based on the one or more channel sensing metrics.

In another aspect of the first embodiment, either alone or in combination with any of the above aspects of the first embodiment, performing the LBT process includes transmitting, by the UE, a signal (e.g., to a Base Station (eNB)) at a time within a contention window or after a fixed sensing time period.

In another aspect of the first embodiment, either alone or in combination with any of the above aspects of the first embodiment, the signal includes a control signal (e.g., a Sounding Reference Signal (SRS)).

In a second embodiment, the present invention embraces an apparatus configured to operate on an unlicensed radio band of a cellular network. The apparatus includes a computing platform having a memory and a processor device in communication with the memory. The apparatus also includes a control application that is stored in the memory, executable by the processor device, and configured for: determining one or more channel sensing metrics for a radio channel; and based on the one or more channel sensing metrics, determining (i) a Listen Before Talk (LBT) mode or (ii) a LBT sensing time.

In one aspect of the second embodiment, the apparatus is a Base Station (eNB). In a particular embodiment, the control application is configured for performing the method in accordance with any aspect of the first embodiment.

In another aspect of the second embodiment, the apparatus is a User Equipment (UE). In a particular embodiment, the control application is configured for performing the method in accordance with any aspect of the first embodiment.

In a third embodiment, the present invention embraces a cellular communication network configured to operate on an unlicensed radio band. The cellular communication network includes a Base Station (eNB) apparatus having a computing platform having a memory, a processor device in communication with the memory, and a control application stored in the memory and executable by the processor device. The control application is configured for: determining one or more first channel sensing metrics for a radio channel; based on the one or more first channel sensing metrics, determining a Listen Before Talk (LBT) mode; and transmitting the LBT mode to a User Equipment (UE). The cellular communication network also includes the UE, which includes a second computing platform having a second memory, a second processor device in communication with the second memory, and a second control application stored in the second memory and executable by the second processor device. The second is configured for: receiving the LBT mode from the eNB; determining one or more second channel sensing metrics for the radio channel; based on the one or more second channel sensing metrics, determining the LBT sensing time; and performing a LBT process using (i) the LBT mode and (ii) the LBT sensing time.

Thus, systems, apparatus, methods, and computer program products herein described in detail below provide for transmitting a Sounding Reference Signal (SRS) or other signals over a cellular network operating on an unlicensed radio band by determining characteristics for LBT operation.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment (UE). For the purpose of sending or receiving data, the device may connect to a wireless local area network (WLAN) or a mobile/cellular communication network (including evolution of 3GPP LTE releases, 3GPP LAA releases, and $5^{th}$ Generation (5G) LTE releases). Any cellular network described herein may have one or more base stations (BS), otherwise referred to as "eNB", and/or access points (AP).

As discussed in detail herein, the present invention provides for transmitting a Sounding Reference Signal (SRS) or other signals (e.g., control or reference signals) over a cellular network operating on an unlicensed radio band by determining characteristics for LBT operation. As noted, Listen Before Talk (LBT) operation may be required before transmissions on unlicensed bands, such as in connection with Enhanced Licensed Assisted Access (eLAA). Specifically, embodiments of the present invention provide for a cellular network, specifically, the Base Stations (commonly referred to as eNBs (Evolved Node B)) and/or User Equipment (UE), to determine one or more channel sensing metrics (e.g., channel occupancy metric(s) and/or link quality metric(s)). The channel sensing metrics are then typically used to determine a LBT mode (e.g., a LBT requiring a Contention Window (CW) or a fixed sensing time) for the LBT operation and/or a LBT sensing time (e.g., an initial Contention Window Size (CWS) or a fixed sensing time) for the LBT operation. Thereafter, the UE typically performs the LBT operation using the LBT mode and LBT sensing time. If, as a result of the LBT operation, the UE determines that a channel is unoccupied, the UE typically then transmits a signal (e.g., a control signal) over the channel. By using channel sensing metrics to determine characteristics for LBT operation, the likelihood of interference or data transmission collisions during the transmission of reference signals by a UE can be reduced. Furthermore, by employing the LBT scheme described herein it is not necessary to transmit a signal (e.g., a reference signal) in conjunction with another transmission, such as concatenated with a downlink transmission or transmitted with another uplink transmission (e.g., a Physical Uplink Shared Channel (PUSCH) transmission). Accordingly, the LBT scheme for signal transmission described herein is not overly complex and allows for fair coexistence with other systems operating on unlicensed bands.

Figure 1:
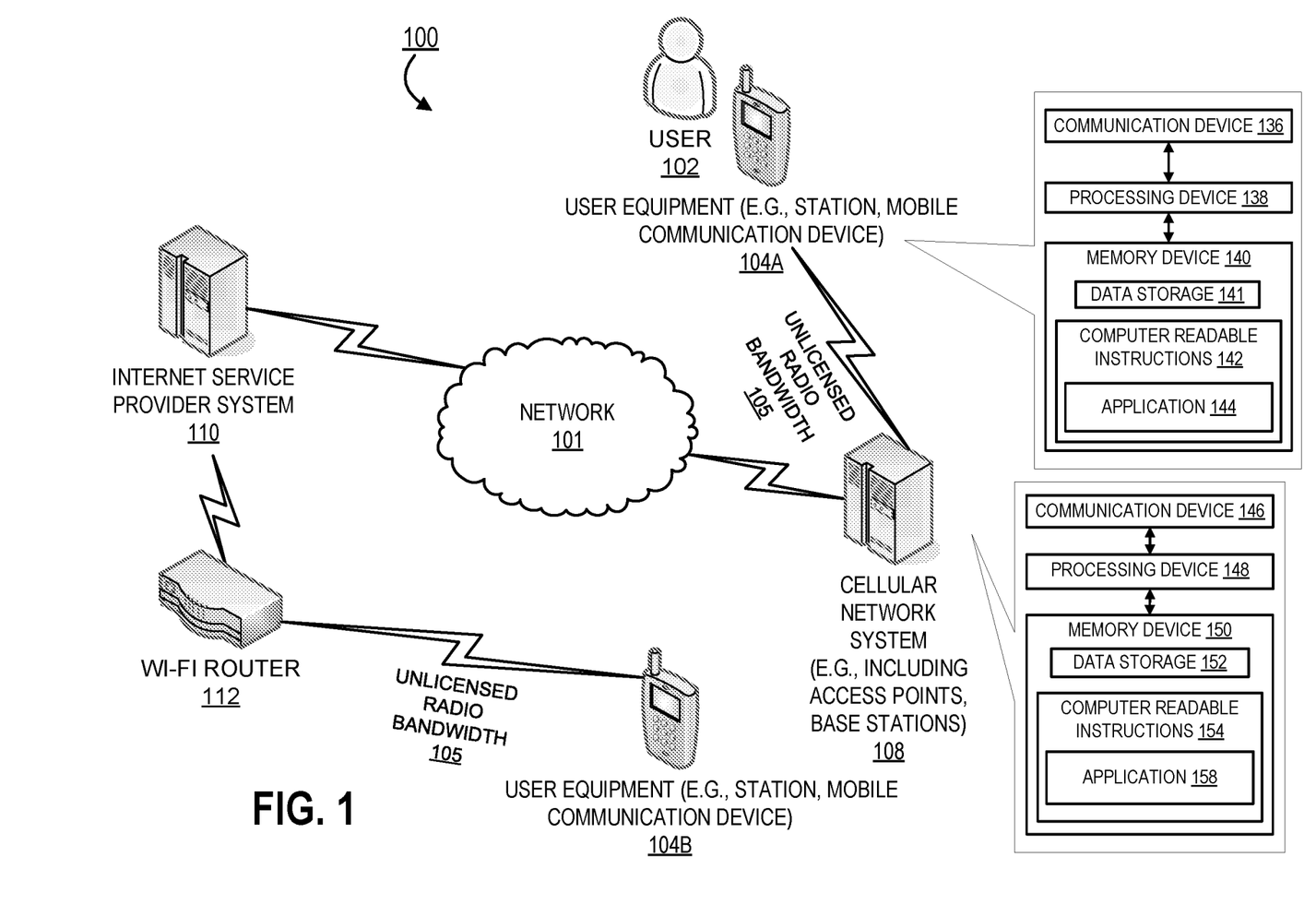
FIG. 1 is a diagram of a User Equipment (UE), operating in an environment according to embodiments of the present invention.

As shown in FIG. 1, a diagram illustrates a User Equipment (UE) (which may be any type of node such as a station, mobile device, access point, or the like that is configured to access a radio access system such as a cellular network system), operating in an environment according to embodiments of the invention.

The cellular network system 108 may be or include one or more base stations (eNB) and/or access points and, in some embodiments, typically includes a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101. As such, the communication device 146 generally includes a modem, server, or other device for communicating with other devices on the network 101, which may include, for example, transmitting reference signals to LTE devices.

As further illustrated in FIG. 1, the cellular network system 108 includes computer-readable instructions 154 stored in the memory device 150, which in one embodiment includes the computer-readable instructions 154 of an application 158. The application 158 is typically configured to perform one or more of the steps described herein, such as those steps described with respect to FIG. 2 and FIG. 3. In some embodiments, the application 158 is configured to determine one or more channel sensing metrics for a radio channel and, based on the one or more channel sensing metrics, determine (i) a LBT mode and/or (ii) a sensing time. In a particular embodiment, the application 158 is configured to transmit a determined LBT mode and/or sensing time to the user equipment 104A. In some embodiments, the memory device 150 includes data storage 152 for storing data related to and/or used by the application 158.

As illustrated in FIG. 1, the user equipment 104A (e.g., a station, mobile device, etc.) generally includes a communication device 136, a processing device 138, and a memory device 140. The processing device 138 is operatively coupled to the communication device 136 and the memory device 140. In some embodiments, the processing device 138 may send or receive data from the user equipment 104, and/or the network system 108 via the communication device 136 over a network 101. As such, the communication device 136 generally includes a modem, server, or other device for communicating with other devices on the network 101.

As further illustrated in FIG. 1, the user equipment 104A includes computer-readable instructions 142 stored in the memory device 140, which in one embodiment includes the computer-readable instructions 142 of an application 144. In the embodiment illustrated in FIG. 1, the application 144 allows the user equipment 104A to be linked to the cellular network system 108 to communicate, via a network 101. The application 144 may also allow the user equipment 106A to connect directly (i.e., locally or device to device) with the user equipment 104B. The application 144 is typically configured to perform one or more of the steps described herein, such as those steps described with respect to FIG. 2 and FIG. 3. The application 144 is also typically configured to perform a LBT operation (e.g., using a determined LBT mode and LBT sensing time), and, if a channel is determined to be unoccupied (e.g., as a result of the LBT operation), transmit a signal (e.g., a reference signal) over the channel. In some embodiments, the application 144 is configured to determine one or more channel sensing metrics for a radio channel and, based on the one or more channel sensing metrics, determine (i) a LBT mode and/or (ii) a sensing time. In some embodiments, the memory device 140 includes data storage 141 for storing data related to and/or used by the application 144. User equipment 104B (e.g., a station, mobile device, or the like) may include one or more components similar to those described with reference to user equipment 104A.

FIG. 1 illustrates the UE 104A accessing the cellular network system 108 using an unlicensed radio bandwidth 105. Similarly, UE 104B accesses WI-FI router 112 over the unlicensed radio bandwidth 105, which enables access to network 101 through internet service provider system 110. Accordingly, both UEs 104A and 104B are utilizing the same unlicensed radio bandwidth. Assuming the UEs are collocated or located in a relatively close geographic proximity, there is an opportunity for data transmission collision or interference. Embodiments of the present invention assist in minimizing such collisions or interference, which may occur during the transmission of reference signals by a UE.

The servers, systems, and/or devices described herein illustrate one embodiment of the invention. It is further understood that one or more of the servers, systems, and devices can be combined in other embodiments and still function in the same or similar way as the embodiments described herein.

Figure 2:
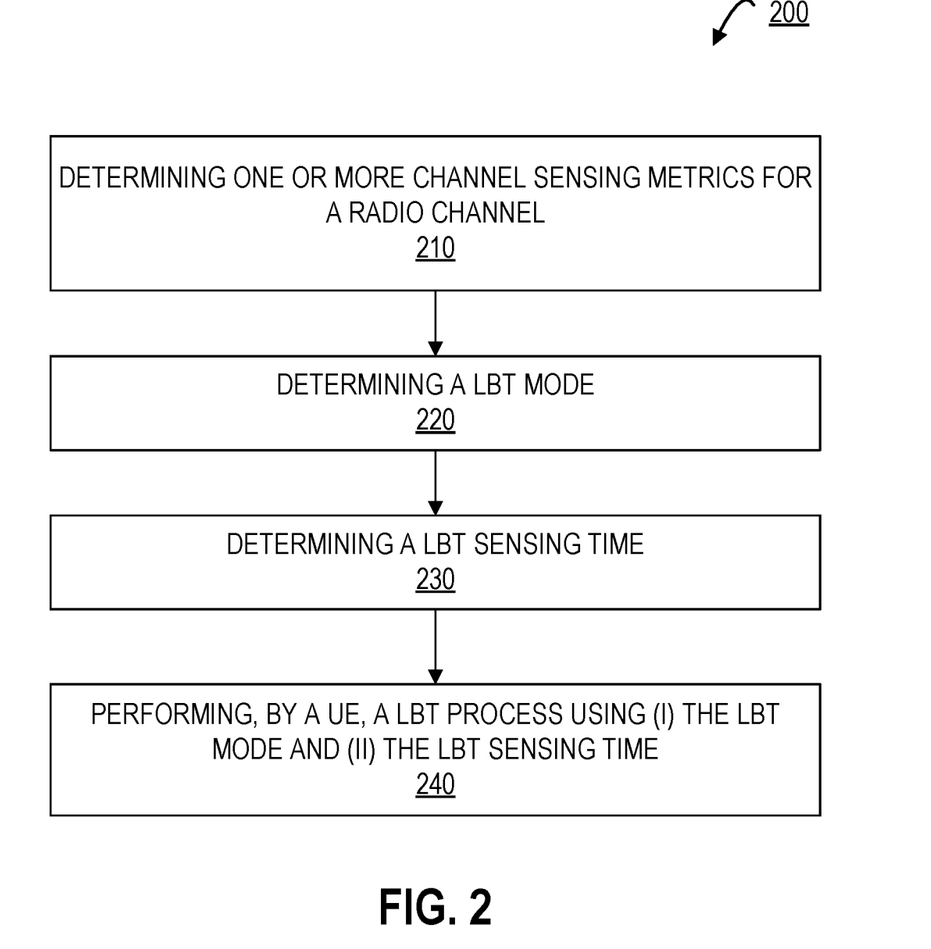
FIG. 2 is a flowchart illustrating a method for transmitting a Sounding Reference Signal (SRS) or other reference signals over a cellular network operating on an unlicensed radio band by determining characteristics for Listen Before Talk (LBT) operation according to embodiments of the present invention.

Referring to FIG. 2 a flow diagram is presented of a method 200 for transmitting a Sounding Reference Signal (SRS) or other signals (e.g., control signals) over a cellular network operating on an unlicensed radio band by determining characteristics for Listen Before Talk (LBT) operation, in accordance with embodiments of the present invention.

At block 210, one or more channel sensing metrics for a radio channel, typically a radio channel on an unlicensed radio band, are determined. In some embodiments, the determined channel sensing metrics include at least one channel occupancy metric. As used herein, a "channel occupancy metric" is any metric that may be used to determine whether a particular radio channel is occupied. In an exemplary embodiment, determining a channel occupancy metric includes determining a received energy level over a channel bandwidth. In some embodiments, the determined channel sensing metrics include at least one link quality metric. As used herein, a "link quality metric" is any metric that may be used to determine whether a communication link between two devices (e.g., between a User Equipment (UE) and a Base Station (eNB)) connected to the cellular network is stable. In an exemplary embodiment, determining a link quality metric includes determining a Received Signal Strength Indicator (RSSI), Reference Signal Received Power (RSRP), Reference Signal Received Quality (RSRQ), signal-to-noise ratio (SNR), or the like for a communication link between a User Equipment and a Base Station. In some embodiments, a channel sensing metric is determined by taking multiple measurements over a period of time and then determining an average (e.g., mean or median) value.

In some embodiments, the one or more channel sensing metrics for the radio channel are determined by a User Equipment (UE). In other embodiments, the one or more channel sensing metrics for the radio channel are determined by a Base Station (eNB). In further embodiment, both the UE and the eNB determine one or more channel sensing metrics. If both the UE and the eNB determine one or more channel sensing metrics, the channel sensing metric(s) determined by the UE and the eNB may be the same or different. For example, the UE may measure the energy level of a channel, and the eNB may determine the quality of the link between the eNB and the UE. Moreover, even if the UE and the eNB determine the same channel sensing metric (e.g., energy level of a channel), the values determined by the UE and eNB may differ (e.g., due to the relative proximity of the UE and eNB to other devices that may cause interference).

At block 220, a LBT mode is determined. As used herein, "LBT mode" refers to the type of channel access scheme that is to be performed by the UE when transmitting reference signals. In some embodiments, the determined LBT mode is that no LBT procedure be performed prior to the UE transmitting a reference signal (e.g., a category 1 channel access scheme as defined in the 3GPP LAA releases). In some embodiments, the determined LBT mode is that the LBT procedure employ a fixed sensing time (e.g., a category 2 channel access scheme as defined in the 3GPP LAA releases). By way of explanation, if a LBT procedure employs a fixed sensing time, the UE will sense the occupancy of a channel for the fixed sensing time and, if the channel is not occupied, the UE will transmit following the fixed sensing time. In some embodiments, the determined LBT mode is that the LBT procedure employ a Contention Window (CW) (e.g., a category 3 or 4 channel access scheme as defined in the 3GPP LAA releases). By way of explanation, if a LBT procedure employs a CW, the UE draws a random number N within the CW. The random number N is then used by the UE as the time the channel is not occupied before the UE transmits on the channel.

Typically, the LBT mode is determined based on one or more of the determined channel sensing metric(s). In typical embodiments, a determined channel sensing metric is compared to a threshold value and, based on this comparison, the LBT mode is selected. Typically, if the determined channel sensing metric(s) indicate low interference on the channel and/or a stable link between the UE and the eNB, a LBT mode requiring a fixed sensing time (e.g., a category 2 channel access scheme as defined in the 3GPP LAA releases) is selected. Moreover, if the determined channel sensing metric(s) indicate high interference on the channel and/or an unstable link between the UE and the eNB, a LBT mode requiring a CW (e.g., a category 3 or 4 channel access scheme as defined in the 3GPP LAA releases) is typically selected. In an exemplary embodiment, the determined energy level for the channel is compared to a threshold value. If the determined energy level exceeds the threshold value, a LBT mode requiring a CW (e.g., a category 3 or 4 channel access scheme as defined in the 3GPP LAA releases) is selected. However, if the determined energy level is below the threshold value, then a LBT mode requiring a fixed sensing time (e.g., a category 2 channel access scheme as defined in the 3GPP LAA releases) is selected.

Although the LBT mode is typically determined based on one or more of the determined channel sensing metric(s), it is within the scope of the present invention for the LBT mode to be determined based on other considerations. For example, determining the LBT mode may be based on the type of signal to be transmitted, rather than channel sensing metrics. By way of further example, the eNB or UE may be configured to select a default LBT mode.

In some embodiments, the LBT mode is determined by the eNB. If the LBT mode is determined by the eNB, the determined LBT mode is typically transmitted by the eNB to the UE. In other embodiments, the LBT mode is determined by the UE. Typically, the device (e.g., the UE or the eNB) making the LBT mode determination will use one or more channel sensing metrics determined by that same device in making the LBT mode determination. That said, in some embodiments, the device making the LBT mode determination employs one or more channel sensing metrics determined by a different device. For example, the UE may receive one or more channel sensing metrics from the eNB and then use these channel sensing metrics (e.g., alone or in combination with channel sensing metrics determined by the UE) in determining the LBT mode.

In some embodiments, multiple LBT modes are determined. For example, the eNB may determine (e.g., based on one or more channel sensing metrics) that the UE may employ either a category 3 or 4 channel access scheme when transmitting a reference signal.

At block 230, a LBT sensing time is typically determined. As used herein, "LBT sensing time" refers to the length of time in a LBT procedure during which the channel is sensed to be unoccupied before a transmission is made. In some embodiments, the LBT sensing time is a fixed sensing time period (e.g., if the determined LBT mode requires a fixed sensing time). In other embodiments, the LBT sensing time is an initial Contention Window Size (CWS) (e.g., if the determined LBT mode requires a Contention Window (CW)).

Typically, the LBT sensing time is determined based on one or more of the determined channel sensing metric(s). In typical embodiments, a determined channel sensing metric is compared to a threshold value and, based on this comparison, the LBT sensing time is selected. Typically, if the determined channel sensing metric(s) indicate low interference on the channel and/or a stable link between the UE and the eNB, a shorter LBT sensing time (e.g., a shorter CWS or fixed sensing time period) is selected. Moreover, if the determined channel sensing metric(s) indicate high interference on the channel and/or an unstable link between the UE and the eNB, a longer LBT sensing time (e.g., a longer CWS or fixed sensing time period) is typically selected. In an exemplary embodiment, the determined energy level for the channel is compared to a threshold value. If the determined energy level exceeds the threshold value, a longer LBT sensing time is selected. However, if the determined energy level is below the threshold value, then a shorter LBT sensing time is selected.

Although the LBT sensing time is typically determined based on one or more of the determined channel sensing metric(s), it is within the scope of the present invention for the LBT sensing time to be determined based on other considerations. For example, the eNB or UE may be configured to select a default LBT sensing time. However, typically at least one of the LBT mode and the LBT sensing time is determined based on one or more of the determined channel sensing metric(s).

In some embodiments, the LBT sensing time is determined by the eNB. If the LBT sensing time is determined by the eNB, the determined LBT sensing time is typically transmitted by the eNB to the UE. In other embodiments, the LBT sensing time is determined by the UE. Typically, the device (e.g., the UE or the eNB) making the LBT sensing time determination will use one or more channel sensing metrics determined by that same device in making the LBT sensing time determination. That said, in some embodiments, the device making the LBT sensing time determination employs one or more channel sensing metrics determined by a different device. For example, the UE may receive one or more channel sensing metrics from the eNB and then use these channel sensing metrics (e.g., alone or in combination with channel sensing metrics determined by the UE) in determining the LBT sensing time.

In some embodiments, the one or more channel sensing metrics used in determining the LBT sensing time are the same channel sensing metrics used in determining the LBT mode. In other embodiment, the one or more channel sensing metrics used in determining the LBT sensing time differ from the channel sensing metrics used in determining the LBT mode.

At block 240, the UE performs a LBT process using the determined LBT mode and the determined LBT sensing time. In this regard, the UE will typically determine whether the channel is occupied in accordance with the determined LBT mode and the determined LBT sensing time. For example, if the LBT mode requires a fixed sensing time period, the UE will typically determine if the channel is unoccupied for a determined fixed sensing time period. By way of further example, if the LBT mode requires a CW, the UE will typically determine if the channel is unoccupied for a random time period within the determined CWS. If the channel is unoccupied, the UE will then typically transmit a signal, such as a reference signal (e.g., a Sounding Reference Signal (SRS)), (e.g., within the CW or following the fixed sensing time period). In some instances, the UE transmits the signal (e.g., control signal) to the eNB. However, in other instances, the UE transmits the signal to another device (e.g., node) within the cellular network.

As noted, in some exemplary embodiments multiple LBT modes are determined to be suitable for this LBT process. For example, the eNB may determine that UE may employ a category 3 or 4 channel access scheme. Accordingly, if multiple LBT modes have been determined to be suitable, the UE will select one of the LBT modes to use in the LBT process. This selection may be based on one or more of the determined channel sensing metric(s) or may be based on other factors, such as the type of signal to be transmitted.

Figure 3:
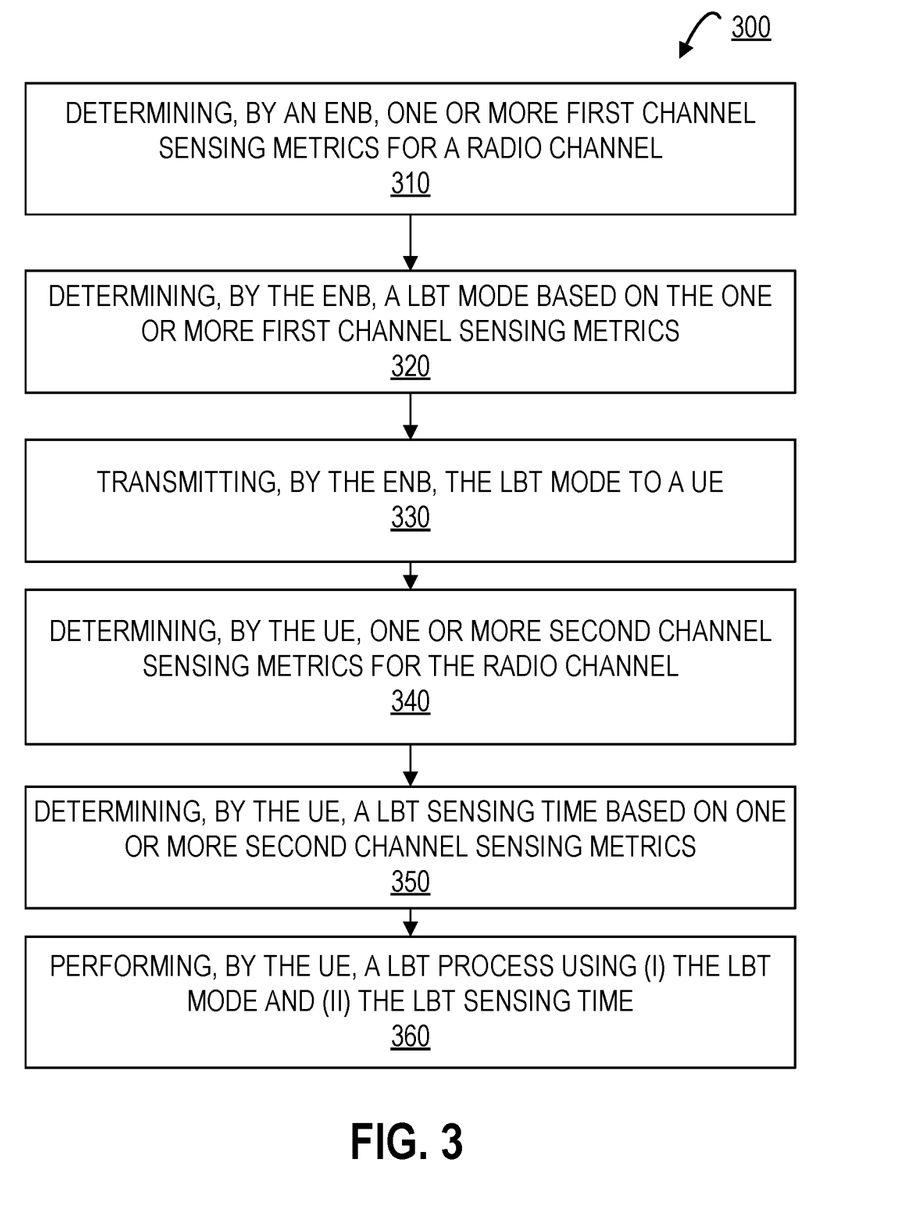
FIG. 3 is a flowchart illustrating a method for transmitting a SRS or other reference signals over a cellular network operating on an unlicensed radio band by determining characteristics for LBT operation according to a particular embodiment of the present invention.

FIG. 3 depicts a flow diagram of a method 300 for transmitting a Sounding Reference Signal (SRS) or other reference signals over a cellular network operating on an unlicensed radio band by determining characteristics for Listen Before Talk (LBT) operation, in accordance with a particular embodiment of the present invention.

At block 310, the eNB determines one or more first channel sensing metrics for a radio channel. As described above, the first channel sensing metrics typically includes a channel occupancy metric and/or a link quality metric. Based on the one or more first channel sensing metrics, at block 320, the eNB then determines a LBT mode, such as a LBT mode that requires a fixed sensing time period or a LBT mode that requires a CW. In an exemplary embodiment, and as described above, at least one of the first channel sensing metrics is compared to a threshold valve, and the LBT mode is selected based on whether the at least one of the first channel sensing metrics exceeds the threshold value. Once the eNB determines the LBT mode, at block 330, the eNB transmits the determined LBT mode to the UE.

At block 340, the UE determines one or more second channel sensing metrics for the radio channel. As described above, the second channel sensing metrics typically includes a channel occupancy metric and/or a link quality metric. Based on the one or more second channel sensing metrics, at block 350, the UE determines a LBT sensing time, such as an initial CWS or a fixed sensing time period. In an exemplary embodiment, and as described above, at least one of the second channel sensing metrics is compared to a threshold valve, and the LBT sensing time is determined based on whether the at least one of the second channel sensing metrics exceeds the threshold value. At block 360, the UE performs a LBT process using the LBT mode and the LBT sensing time. If the radio channel is not occupied, the UE will then typically transmit a signal, such as a reference signal (e.g., a SRS), to the eNB.

Thus, systems, apparatus, methods, computer program products and the like described above provide for transmitting a SRS or other signals over a cellular network operating on an unlicensed radio band by determining characteristics for LBT operation. Specifically, the UE or eNB determine one or more channel sensing metrics. The channel sensing metrics are then typically used to determine a LBT mode for the LBT operation and/or a LBT sensing time for the LBT operation. Thereafter, the UE typically performs the LBT operation using the LBT mode and LBT sensing time. If, as a result of the LBT operation, the UE determines that a channel is unoccupied, the UE typically then transmits a signal (e.g., control signal) over the channel. By using channel sensing metrics to determine characteristics for LBT operation, the likelihood of interference or data transmission collisions during the transmission of reference signals by a UE can be reduced.

Unless specified, the invention is not limited to any particular types of devices (either access points, UEs, stations or otherwise). As used herein, a device may also be referred to as a UE, a system, a base station, an access point or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable or non-portable computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for determining Listen Before Talk (LBT) characteristics for operating on an unlicensed radio band of a cellular network, the method comprising:
   determining one or more channel sensing metrics for a radio channel, wherein the one or more channel sensing metrics include at least a channel occupancy metric;
   based on the one or more channel sensing metrics, determining (i) a LBT mode or (ii) a LBT sensing time;
   performing a LBT process using at least one of (i) the LBT mode or (ii) the LBT sensing time determined; and
   when allowed according to the LBT process, performing a transmission on the radio channel.

2. The method of claim 1, wherein determining the one or more channel sensing metrics comprises determining a link quality metric.

3. The method of claim 1, wherein the LBT sensing time comprises an initial Contention Window Size (CWS) or a fixed sensing time period.

4. The method of claim 1, wherein determining (i) the LBT mode or (ii) the LBT sensing time comprises:
   comparing a first channel sensing metric of the one or more channel sensing metrics to a threshold value; and
   based on comparing the first channel sensing metric to the threshold value, determining the LBT mode.

5. The method of claim 1, wherein the LBT mode requires a Contention Window (CW).

6. The method of claim 1, wherein the LBT mode requires a fixed sensing time period.

7. The method of claim 1, wherein determining (i) the LBT mode or (ii) the LBT sensing time comprises:
   comparing a first channel sensing metric of the one or more channel sensing metrics to a threshold value; and
   based on comparing the first channel sensing metric to the threshold value, determining the LBT sensing time.

8. The method of claim 1, wherein:
   determining the one or more channel sensing metrics comprises determining, by a Base Station (eNB), the one or more channel sensing metrics;
   determining (i) the LBT mode or (ii) the LBT sensing time comprises determining, by the eNB, (i) the LBT mode or (ii) the LBT sensing time based on the one or more channel sensing metrics; and
   the method comprises transmitting, by the eNB, (i) the LBT mode or (ii) the LBT sensing time to a User Equipment (UE).

9. The method of claim 8, wherein:
   determining (i) the LBT mode or (ii) the LBT sensing time comprises determining, by the eNB, (i) the LBT mode and (ii) the LBT sensing time based on the one or more channel sensing metrics; and transmitting (i) the LBT mode or (ii) the LBT sensing time comprises transmitting, by the eNB, (i) the LBT mode and (ii) the LBT sensing time to a User Equipment (UE).

10. The method of claim 1, comprising performing, by a User Equipment (UE), the LBT process using (i) the LBT mode and (ii) the LBT sensing time;
    wherein determining the one or more channel sensing metrics comprises determining, by the UE, the one or more channel sensing metrics; and
    wherein determining (i) the LBT mode or (ii) the LBT sensing time comprises determining, by the UE, (i) the LBT mode or (ii) the LBT sensing time based on the one or more channel sensing metrics.

11. The method of claim 10, wherein determining (i) the LBT mode or (ii) the LBT sensing time comprises determining, by the UE, (i) the LBT mode and (ii) the LBT sensing time based on the one or more channel sensing metrics.

12. The method of claim 10, comprising receiving, by the UE, the LBT mode from a Base Station (eNB);
    wherein determining (i) the LBT mode or (ii) the LBT sensing time comprises determining, by the UE, the LBT sensing time based on the one or more channel sensing metrics.

13. The method of claim 10, wherein performing the LBT process comprises transmitting, by the UE, a signal at a time within a contention window or after a fixed sensing time period.

14. The method of claim 13, wherein the signal comprises a control signal.

15. An apparatus configured to operate on an unlicensed radio band of a cellular network, the apparatus comprising:
    a computing platform having a memory and a processor device in communication with the memory; and
    a control application stored in the memory, executable by the processor device, and configured for:
        determining one or more channel sensing metrics for a radio channel, wherein the one or more channel sensing metrics include at least a channel occupancy metric;
        based on the one or more channel sensing metrics, determining (i) a Listen Before Talk (LBT) mode or (ii) a LBT sensing time;
        performing a LBT process using at least one of (i) the LBT mode or (ii) the LBT sensing time determined; and
        when allowed according to the LBT process, performing a transmission on the radio channel.

16. The apparatus of claim 15, wherein the apparatus is a Base Station (eNB).

17. The apparatus of claim 15, wherein the apparatus is a User Equipment (UE).

18. A cellular communication network configured to operate on an unlicensed radio band, comprising:
    a Base Station (eNB) apparatus, the eNB comprising a computing platform having a memory, a processor device in communication with the memory, and a control application stored in the memory, executable by the processor device, and configured for:
        determining one or more first channel sensing metrics for a radio channel wherein the one or more first channel sensing metrics include at least a channel occupancy metric;
        based on the one or more first channel sensing metrics, determining a Listen Before Talk (LBT) mode; and
        transmitting the LBT mode to a User Equipment (UE); and
    the UE, the UE comprising a second computing platform having a second memory, a second processor device in communication with the second memory, and a second control application stored in the second memory, executable by the second processor device, and configured for:
        receiving the LBT mode from the eNB;
        determining one or more second channel sensing metrics for the radio channel;
        based on the one or more second channel sensing metrics, determining a LBT sensing time; and
        performing a LBT process using (i) the LBT mode and (ii) the LBT sensing time.

* * * * *